W. R. BRIGGS.
DEMOUNTABLE TIRE RIM.
APPLICATION FILED MAR. 3, 1917.

1,252,391.

Patented Jan. 8, 1918.

Inventor
Warren R. Briggs
By Chamberlain & Newman
Attorneys

UNITED STATES PATENT OFFICE.

WARREN R. BRIGGS, OF STRATFORD, CONNECTICUT.

DEMOUNTABLE TIRE-RIM.

1,252,391. Specification of Letters Patent. Patented Jan. 8, 1918.

Application filed March 3, 1917. Serial No. 152,187.

*To all whom it may concern:*

Be it known that I, WARREN R. BRIGGS, a citizen of the United States, and resident of Stratford, in the county of Fairfield and State of Connecticut, have invented certain new and useful Improvements in Demountable Tire-Rims, of which the following is a specification.

This invention relates to new and useful improvements in demountable rims for automobile wheels, such as are employed to carry a pneumatic tire ready for use.

The object of the invention is to provide a sectional two part demountable tire rim that is made of a pair of telescopic and interlocking sheet metal members, which when dismounted from the wheel will greatly facilitate the removal or attachment of a tire; to particularly design the rim members so that one will be in the form of a closed ring member having a fixed diameter, while the other is open and thus flexible and adapted to be contracted to enter the outer member and provided with means for locking the two sections together.

The device therefore, briefly comprises an outer unbroken solid ring member having a flange upon one edge and including suitable holding lugs, and an inner open member also having a flange upon one edge and cut out at proper points to receive the lugs of the outer ring member when expanded thereagainst, the two said members being so formed and constructed that when assembled they form a rim, the band portion of which will include two thicknesses of metal and have an outwardly disposed flange upon both edges suitable to hold a tire therebetween.

In order to afford a proper understanding of the invention I have illustrated the same upon the accompanying sheet of drawings forming a part of this specification and upon which similar characters of reference will be found to indicate like or corresponding parts throughout the several figures and of which, Figure 1 shows a perspective view of the inner expandible open ring member of my improved tire rim.

My invention consists of two specially rolled and formed sheet metal rim members which are designed to take the place of the single demountable rim commonly employed on auto wheels. These two rims as employed by me are much lighter in weight than the common forms of rims above suggested and so that when assembled and applied in use my double form of rim will not be much heavier than the single rims referred to. The outer rim member which is shown in Fig. 2 and designated as A comprises an annular sheet metal ring member of a uniform diameter and having an outwardly disposed flange 5 formed upon one edge and which in practice serves as a shoulder against which the inner edge portion of the tire shoe is seated.

Figure 2:
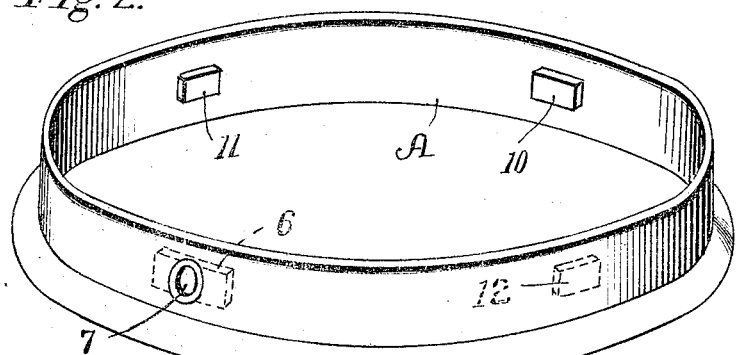
Fig. 2 is a similar perspective view of the solid outer ring member and in which the inner member shown in Fig. 1, is seated.

Upon the inside of the body or cylindrical portion of this rim is a series of preferably four lugs, as it is clearly shown in Fig. 2. The larger one of these lugs is indicated as 6 and has a round hole 7 formed therethrough to accommodate the valve tube 8 secured to the inner tube 9. The second lug 10 is also located upon the inside and directly opposite to the first mentioned lug 6. Similar, but somewhat shorter lugs 11 and 12 are also arranged upon the inner wall of this rim member as is clearly indicated in Fig. 2 and as will be noted they are located upon the quarters of the ring or substantially midway between the before mentioned lugs 6 and 10.

Figure 1:
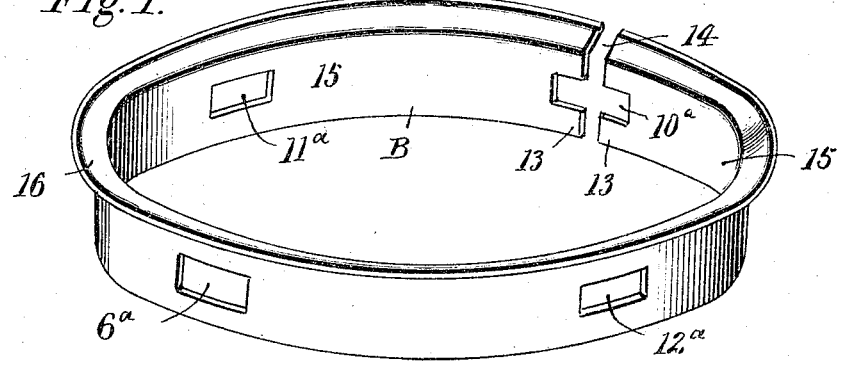

The inner rim member indicated by B in Fig. 1 is also formed of sheet metal, but is what might be termed an open or broken ring or band adapted to be contracted and expanded, the end portions 13 being disposed adjacent to and in alinement with each other, but normally spaced one from the other as is indicated at 14. This rim member includes straight side walls 15 and a flange 16, both said body portion and flange being similar to that of the outer rim member A and proportioned to fit within and against the said outer rim member. This expanding open rim member is provided with holes or pockets $6^a$, $10^a$, $11^a$ and 12ª to receive the before mentioned lugs 6, 10, 11 and 12 respectively. The pocket or slot 6ª is of substantially the same size as the lug 6 so as to fit the same when the rim member is seated thereagainst. The pockets 11ª and 12ª are cut somewhat larger and particularly longer than the lugs over which they fit so as to provide for such slight annular movement of the inner rim member within the outer as may be necessary to permit of an adjustment of the one within the other. The same is in a sense true of the pocket 10ª formed in the end portion of the inner rim member which allows said portions to be adjusted radially and annularly within the outer rim member and with relation to the lug 10 secured upon the outer rim member. From the foregoing construction it would be apparent that there would be relatively no radial movement of that portion of the inner rim member lying adjacent to the lug 6, but that the movement of the inner rim member when adjusting the same to position would be confined to the free end portions.

Figure 3:
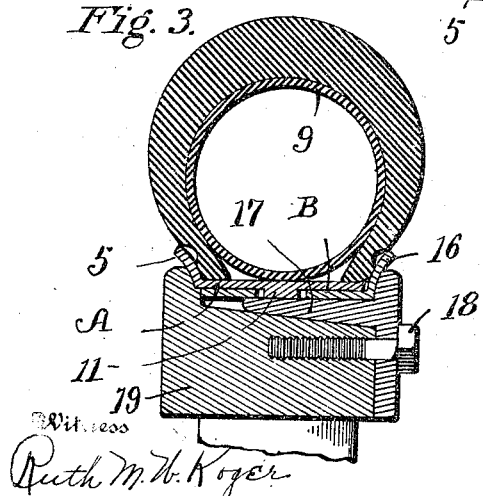
Fig. 3 shows a cross section through my improved form of demountable rim having a tire mounted thereon and fitted to a wheel felly and Fig. 4 is a longitudinal section through a portion of a wheel felly provided with my improved form of demountable rim and a heavy tire mounted thereon.
Figure 4:
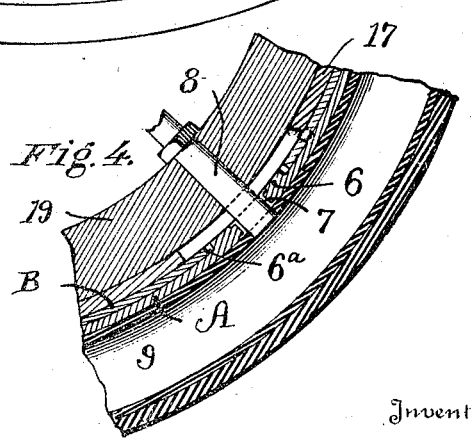

In applying an inflated tire and shoe to my improved form of demountable rim the operator would preferably lay the outer rim section A down flat upon the floor or ground as is suggested by Fig. 2. Then place the inflated tire thereon, care being taken to see that the tube 9 for the valve was properly placed through the hole 7. Then the end portions of the inner rim member would be drawn together by any suitable means. The inner rim member is placed within the outer rim in a way to first have the pockets 6ª positioned over the valve stem and lug thereby bringing the larger pockets 11ª and 12ª and 10ª to register with the remaining lugs projecting inward from the outer rim member. The moment the pockets of the inner rim member have fitted over the lugs upon the outer rim member the inner rim member would be released and allowed to expand so as to secure the parts in position. The tire would thus be positioned on the rim ready to be shoved on the wheel rim in the manner indicated in Fig. 3. The outer rim portion is positioned against the inner flange of the wheel felly and the wedges 17 are shoved in between the wheel felly 19 and the inner rim member and against the flange of the latter so as to force it out against the outer rim member by the screw bolts 18 when placed in position and which also fit up against the flange of the outer flange of the inner rim member to firmly hold the parts together.

From the foregoing it will be seen that the outer surface of the outer rim member, and upon which the tire is mounted is perfectly smooth, having no pockets in which dirt may collect.

A demountable rim of this character can be as quickly attached and detached from a wheel as the common form of single rims and when so detached will permit of an old tire being removed and a new tire placed thereon much easier than is the case with the old form of single piece rims having a flange upon both ends.

Having thus described my invention what I claim and desire to secure by Letters Patent is:—

In combination, a pair of annular rim members, each of which is formed with a lateral curved flange, one of said rim members being formed with a plurality of circumferentially spaced openings and having separated ends provided with complemental recesses adapted to provide another opening, and a circumferentially extending series of lugs formed medially upon the inner circumference of the other rim member and adapted to enter said openings, when said first rim member is sprung into the other rim member, one of said lugs being formed with a valve receiving opening, said lugs projecting flush with the inner circumference of the perforated rim member.

Signed at Bridgeport, in the county of Fairfield and Sate of Connecticut, this 28th day of February, A. D. 1917.

WARREN R. BRIGGS.

Witnesses:
C. M. NEWMAN,
RUTH M. W. KOGER.